(12) United States Patent
Sackstein (10) Patent No.: US 10,570,044 B2
(45) Date of Patent: Feb. 25, 2020

(54) METHOD AND SYSTEM FOR TREATING WATER

(71) Applicant: BIOPUREMAX (2015) LTD., Herzeliya Pituach (IL)

(72) Inventor: Shlomo Sackstein, Ra'anana (IL)

(73) Assignee: BIOPUREMAX (2015) LTD., Herzeliya Pituach (IL)

( * ) Notice: Subject to any disclaimer, the term of this patent is extended or adjusted under 35 U.S.C. 154(b) by 761 days.

(21) Appl. No.: 13/769,395

(22) Filed: Feb. 18, 2013

(65) Prior Publication Data
US 2014/0231348 A1    Aug. 21, 2014

(51) Int. Cl.
| | | |
|---|---|---|
| C02F 9/00 | (2006.01) | |
| C02F 1/32 | (2006.01) | |
| C02F 1/46 | (2006.01) | |
| C02F 1/04 | (2006.01) | |
| C02F 1/469 | (2006.01) | |
| C02F 1/44 | (2006.01) | |

(52) U.S. Cl.
CPC .............. *C02F 9/00* (2013.01); *C02F 1/32* (2013.01); *C02F 1/4602* (2013.01); *C02F 1/045* (2013.01); *C02F 1/441* (2013.01); *C02F 1/4695* (2013.01); *C02F 2303/185* (2013.01)

(58) Field of Classification Search
CPC ........................................................ C02F 1/32
See application file for complete search history.

(56) References Cited

U.S. PATENT DOCUMENTS

| | | | |
|---|---|---|---|
| 4,152,238 A | 5/1979 | Okazaki | |
| 5,788,826 A * | 8/1998 | Nyberg | B01J 47/08 |
| | | | 204/536 |
| 6,328,896 B1 * | 12/2001 | Atnoor et al. | 210/669 |
| 6,572,902 B2 | 6/2003 | Abramowitz et al. | |
| 8,101,083 B2 * | 1/2012 | Ruehr | B01D 61/025 |
| | | | 210/202 |
| 8,419,925 B2 | 4/2013 | Sherzer | |
| 2003/0034292 A1 | 2/2003 | Rela | |

(Continued)

FOREIGN PATENT DOCUMENTS

| | | | | |
|---|---|---|---|---|
| CN | 102452754 | | 5/2012 | |
| CN | 202705085 U | * | 1/2013 | C02F 1/32 |

(Continued)

OTHER PUBLICATIONS

Yu Qing et al., Machine Translation of CN 202705085 U provided by EPO and Google, pp. 1-7.*

(Continued)

*Primary Examiner* — Bobby Ramdhanie
*Assistant Examiner* — Michael J An
(74) *Attorney, Agent, or Firm* — A.C. Entis-IP Ltd.; Allan C. Entis; Kenichi N. Hartman (57) ABSTRACT

Aspects of embodiments relate to a method for treating water received at a treatment system. The method may include reducing the hardness of the water by subjecting the water to electrolysis by an electrolytic hardness reducer; and substantially removing disinfectant from the water by irradiating the water with ultraviolet light by a UV disinfectant reducer. The method may further include sanitizing the electrolytic hardness reducer and/or sanitizing the UV disinfectant reducing apparatus by running hot water through either one or both of them.

20 Claims, 5 Drawing Sheets

(56) References Cited

U.S. PATENT DOCUMENTS

| | | | |
|---|---|---|---|
| 2004/0050761 | A1 | 3/2004 | Gsell |
| 2005/0016932 | A1* | 1/2005 | Arba et al. .................. 210/748 |
| 2005/0218084 | A1 | 10/2005 | Leung et al. |
| 2005/0263457 | A1* | 12/2005 | Wilkins et al. ............. 210/663 |
| 2005/0274602 | A1 | 12/2005 | Herrington et al. |
| 2006/0027463 | A1 | 2/2006 | Lavelle et al. |
| 2006/0071090 | A1* | 4/2006 | Eisenhower ........ F24D 17/0073 237/2 A |
| 2008/0230450 | A1* | 9/2008 | Burbank et al. ............... 210/92 |
| 2009/0095666 | A1 | 4/2009 | Heiss |
| 2009/0242424 | A1* | 10/2009 | Behr .......................... 205/757 |
| 2010/0163471 | A1* | 7/2010 | Elyanow ............. B01D 61/022 210/176 |
| 2011/0024361 | A1 | 2/2011 | Schwartzel et al. |
| 2012/0043223 | A1 | 2/2012 | Sherzer |

FOREIGN PATENT DOCUMENTS

| | | |
|---|---|---|
| IL | 212746 | 7/2011 |
| WO | 2012150593 | 11/2012 |
| WO | 2012023139 | 2/2013 |

OTHER PUBLICATIONS

Hartman, Kenichi, Inquiry with regards to Notice of Allowance, Email Communication, dated Nov. 20, 2019, p. 1, (Year: 2019).*

PCT Search Report dated May 19, 2014 for corresponding PCT Application PCT/IL2014/050171 filed Feb. 17, 2014.

Ultraviolet (UV) Sterilization, Fact Sheet, Cal Water Industrial Water Purification, XP002614819; Oct. 17, 2004.

UET Dynamic Equilibrium Information: For implementing UET's technology in cooling towers applications (http://uet.co.il/cm/userfiles/28/files/UET-CT-%20dynamic%20equilbrium%20information%20%200311.pdf).

Yesha Berger: Who is afraid of electrolytic scale prevention—an Odyssey: (http://www.uet.co.il/cm/site/uet/page.asp?pid=4223&lang=5).

Nitto Group Company; Chemical Pretreatment for RO and NF; Oct. 2013.

Lenntech BV; Pretreatment-Membrane Fouling Considerations; Jan. 23, 2001.

Reimanes et al; Model water disinfection with electrolysis using TinO2n-1 containing ceramic electrodes; Environmental Biotechnology 7 (1) 2011, 34-40.

Harif et al;The effect of pre-treatment on biofouling of BWRO membranes: A field study; Desalination Publications; Jul. 31, 2011.

Dr. Mark Wilf; Alternative Dechlorination Methods in Reverse Osmosis Applications; Atlantium Technologies Ltd. Nov. 2011.

Office Action dated Apr. 5, 2017 for corresponding Chinese Patent Application No. 2014800217045 filed Feb. 17, 2014.

Office Action dated Jan. 19, 2017 for European Application No. 14715119.5 filed Sep. 7, 2015.

Office Action dated Oct. 17, 2016 for Chinese Application No. 12014800217045 filed Oct. 16, 2015.

Office Action dated Aug. 26, 2016 for European Application No. 147151195 filed Sep. 7, 2015.

* cited by examiner

METHOD AND SYSTEM FOR TREATING WATER

TECHNICAL FIELD

Embodiments relate to the treatment of water.

BACKGROUND

A variety of industries, including the pharmaceutical and microelectronics industries require purified water that meets predetermined purification requirements for their manufacturing processes. Processes typically used to treat municipal water to obtain purified water are generally resource and capital intensive and generally require a number of different treatment stages. Municipal water may be water high in mineral content, also known as hard water. Hard water, if not treated properly, may cause build-up of mineral deposits, also known as scale, in piping and equipment, and cause corrosion.

Scale has the potential to damage equipment and inhibit flow. As a result, one standard water treatment stage relates to the softening of hard water to reduce the concentration of calcium, magnesium, and/or other metal cations. Water provided by municipal water supply may also be treated by adding disinfectants such as free chlorine, chloramine and ozone in order to deactivate microorganisms present in the water to obtain disinfected water.

On the other hand, the above-mentioned disinfectants are strong oxidizing agents which may have the potential of inflicting damage to piping and equipment used in pharmaceutical and microelectronics industries by causing oxidation, e.g., of metals, which may also be referred to as corrosion, and/or of membranes and resins. For these reasons it may be necessary to remove these disinfectants.

SUMMARY

Aspects of embodiments relate to providing a system and method for treating water employing a non-chemical softener that reduces the hardness of water by subjecting it to an electrically-induced dissociation process (henceforth: electrolysis), and a non-chemical disinfectant reducing apparatus, embodied by an ultraviolet (UV) disinfectant reducing apparatus that comprises an UV light source operative to substantially remove disinfectants from water to obtain at the outlet of UV disinfectant reducer water, which may hereinafter be referred to as "pretreated feed water" for use as suitable feed water, e.g., in Reverse Osmosis (RO) and/or Deionization and/or Water For Injection (WFI) distillation processes and/or Pure Steam Generators (PSGs).

Employing electrolysis for reducing water hardness and a UV light source for substantially remove disinfectants from the water may be advantageous, inter alia, with regards to the environmental footprint and/or operating costs and/or the maintenance of the water treatment system. For instance, the amount of undesired chemical waste produced by employing this method may be reduced significantly or avoided altogether. For example, employing an electrolytic hardness reducer obviates the need of employing organic resins which are prone to filter and incubate bacteria suspended in the water. Otherwise stated, the system is free of organic resins, so that the development of biofilm in the system's piping and/or equipment at least in that respect may be significantly retarded or prevented completely. Since the treatment system may be free of organic resins, the need of handling and treating of waste that is related to organic resins may become superfluous.

Aspects of embodiments may also relate to a method that includes reducing water hardness through electrolysis by passing (e.g., through flushing or circulating) water through the electrolytic hardness reducer and substantially removing disinfectants from the water by irradiating the water with UV light by passing (e.g., through flushing or circulating) water through the UV disinfectant reducer. In some embodiments, the method may include sanitizing at least the electrolytic hardness reducer and the UV disinfectant reducer with water at temperatures ranging, for example, from about 65° C. to about 95° C.

As a consequence, lowering water hardness and disinfectant concentration according to embodiments may involve processes that may effect that the treatment system remains substantially free of fouling and while at the same time the employment of chemical reagents in the treatment system may be significantly reduced or substantially obviated altogether, thereby correspondingly reducing or obviating the need to handle related undesirable chemical waste.

In some embodiments, the electrolytic hardness reducer and the UV disinfectant reducer may be employed in association with a Reverse Osmosis (RO) and/or a Deionization process for the production of Purified Water (PW) and/or Highly Purified Water (HPW).

The electrolytic hardness reducer comprising a negatively charged cathode and a positively charged anode is operative to dissociate water molecules of an electrolyte into hydrons ($H^+$) and hydroxide anions ($OH^-$) ions. Reduction of hydrons at the cathode generates hydrogen gas so that the $OH^-$ ion concentration is increased at the negatively charged cathode. The $H^+$ ion concentration may be increased at the positively charged anode. The increase in $OH^-$ concentration near and/or at the cathode may cause local precipitation of scale which, in turn, reduces the hardness of water received by the electrolytic hardness reducer. It follows from the above that increasing the concentration of $OH^-$ near the cathode is related to increasing the pH value or alkalinity near the cathode.

The reduction in water hardness may be performed such that for a given range of parameters (for example, temperature, pressure, flow-rate and/or conductivity) of water in the water treatment system, the latter remains substantially scale-free downstream of the electrolytic hardness reducer and optionally downstream the UV disinfectant reducer, even after passing (e.g., optionally flushing or circulating) the water through RO and distillation apparatuses to undergo reverse osmosis and/or deionization, respectively. Otherwise stated, the electrolytic hardness reducer is configured such that hardness at its outlet is such that for given water parameters the equilibrium conditions for scale to build up in the water treatment system downstream the electrolytic hardness reducer, e.g., in an RO and/or a PSG and/or a WFI distillation apparatus or apparatuses, and optionally, of their respective water outlets, remain substantially unmet. For example, the water hardness may be reduced to an extent so that the treatment system remains substantially free of scale at least up to the location where the water exits the treatment system and, optionally, further up to the location of the point of use by a consumer. For instance, the water hardness may be reduced by the electrolytic hardness reducer to an extent such that for given water temperature and pressure, the time it takes for scale to build up may be retarded, for example by a factor of about 1.5, 2, 3 or 4. For instance, the hardness of water in the water treatment system may be reduced to an extent to obtain pretreated feed water such that a reverse osmosis and/or a deionization and/or a distillation apparatus and/or a PSG provide, at least at their product outlet, substantially scale-free high-quality water which may for example qualify as PW, HPW, PS or WFI. In some embodiments, excluding the electrolytic hardness reducer, the water treatment system may be scale-free.

In correspondence with the aforesaid, aspects of embodiments of the method for treating water received at a treatment system include reducing the hardness of the water by subjecting the water to electrolysis by an electrolytic hardness reducer; and substantially removing disinfectant from the water by irradiating the water with ultraviolet light by a UV disinfectant reducer.

In embodiments, the method may include sanitizing the electrolytic hardness reducer by running hot water through it at a temperature, e.g., ranging from about 65° C. to about 95° C.

In embodiments, the method for may include sanitizing the UV disinfectant reducing apparatus by running hot water through it at a temperature, e.g., ranging from about 65° C. to about 95° C.

In embodiments, the method may include sanitizing a piping and a storage tank of the treatment system by running hot water through them.

In embodiments, the received water is first run through the electrolytic hardness reducer to reduce the water hardness and then through the ultraviolet disinfectant reducer for disinfectant removal.

In embodiments, the received water is first run through the ultraviolet disinfectant reducer for disinfectant removal and then through the electrolytic hardness reducer for reducing the water hardness.

In embodiments, the hardness of the water received by the electrolytic hardness reducer is reduced to an extent to yield hardness-reduced water so that the conditions required for scale to build up remain substantially unmet at least up the water leaves the treatment system.

In embodiments, the concentration of polyvalent cation metals in the hardness-reduced water is relatively high.

In embodiments, the polyvalent cation metal concentration is about equal or greater than about 100 ppm as $CaCO_3$ equivalent.

In embodiments, the polyvalent cation metal concentration is about equal or greater than about 400 ppm as $CaCO_3$ equivalent.

In embodiments, the water hardness is reduced so that precipitation time downstream of UV disinfectant reducer is at least multiplied by a factor of one and a half for a given polyvalent cation concentration, water pressure, and water temperature.

In embodiments, the polyvalent cation concentration in the water may be about 100 ppm, as $CaCO_3$ equivalent, or higher, water pressure may equal about 2 bar or more; and the water temperature may be at least about 10° C. or at least about 20° C.

In embodiments, the polyvalent cation concentration in the water may be about 180 ppm, as $CaCO_3$ equivalent, or higher, water pressure may be about 12 bar or more, and the water temperature may be at least about 10° C. or at least about 20° C.

In embodiments, the polyvalent cation concentration in the water may be about 180 ppm or higher, as $CaCO_3$ equivalent, water pressure may equal about 15 bar or more, and the water temperature may be at least about 10° C. or at least about 20° C.

In embodiments, the polyvalent cation concentration in the water may be about 180 ppm or higher, as $CaCO_3$ equivalent, water pressure may equal about 15 bar or more, and the water temperature may be about 25° C. or higher.

In embodiments, the electrolysis hardness reducer may reduce water hardness in a manner that is free of the employment of chemical reagents.

In embodiments, the method may include subjecting the water to reverse osmosis and/or deionization.

In embodiments, the method may include evaporation of the water to obtain at least one of the products selected from a group of high-quality water products consisting of: water for injection, and pure steam.

Aspects of embodiments relate to a water treatment system, comprising: an electrolytic hardness reducer; and an ultraviolet disinfectant reducer that is in fluid communication with the electrolysis hardness reducer.

In embodiments, the electrolytic hardness reducer may be operative to reduce the hardness of water provided by a tap water supply to obtain hardness-reduced water and to provide the ultraviolet disinfectant reducer with the hardness-reduced water to substantially remove disinfectants from the hardness-reduced water.

In embodiments, the water treatment system may comprise a reverse osmosis apparatus and a deionization apparatus that are in fluid communication with the electrolysis hardness reducer and the ultraviolet disinfectant reducer.

In embodiments, the water treatment system may be free of a sodium bisulfite supply and free of an active carbon filter used in conventional systems for impurities removal.

The expression "high-quality water" as used herein may relate to water having lower concentration of impurities compared to pretreated feed water. The expression "impurities" as may be used herein in the specification and/or the claims may refer to water-related impurities and any combination thereof selected from a group consisting of: ions, microorganisms, and organic compounds.

This Summary is provided to introduce a selection of concepts in a simplified form that are further described below in the detailed description. This Summary is not intended to identify key features or essential features of the claimed subject matter, nor is it intended to be used to limit the scope of the claimed subject matter.

BRIEF DESCRIPTION OF THE FIGURES

Non-limiting examples of embodiments are described below with reference to figures attached hereto that are listed following this paragraph. Identical structures, elements or parts that appear in more than one figure are generally labeled with a same numeral in all the figures in which they appear, and a numeral labeling an icon representing a given feature in a figure may be used to reference the given feature. Dimensions of components and features shown in the figures are chosen for convenience and clarity of presentation and are not necessarily shown to scale.

DESCRIPTION

In the description below, aspects of embodiments are discussed with respect to a water treatment system and method.

High-quality water obtained by the water treatment system and method may, in some embodiments, for example, qualify as compendial United States Pharmacopoeia (USP) and/or European Pharmacopoeia (EP) Water for Injection (WFI), Highly Purified Water (HPW), Water for Hemodialysis (WFH), Sterile Purified Water, Sterile Water for Injection, Sterile Water for Irrigation, Bacteriostatic Water for Injection, Sterile Water for Inhalation, and/or reagent-quality water. Steam obtained by the water treatment system and method may, in some embodiments, qualify as compendial United States Pharmacopoeia (USP) and/or European Pharmacopoeia (EP) Pure Steam (PS)

Figure 1:
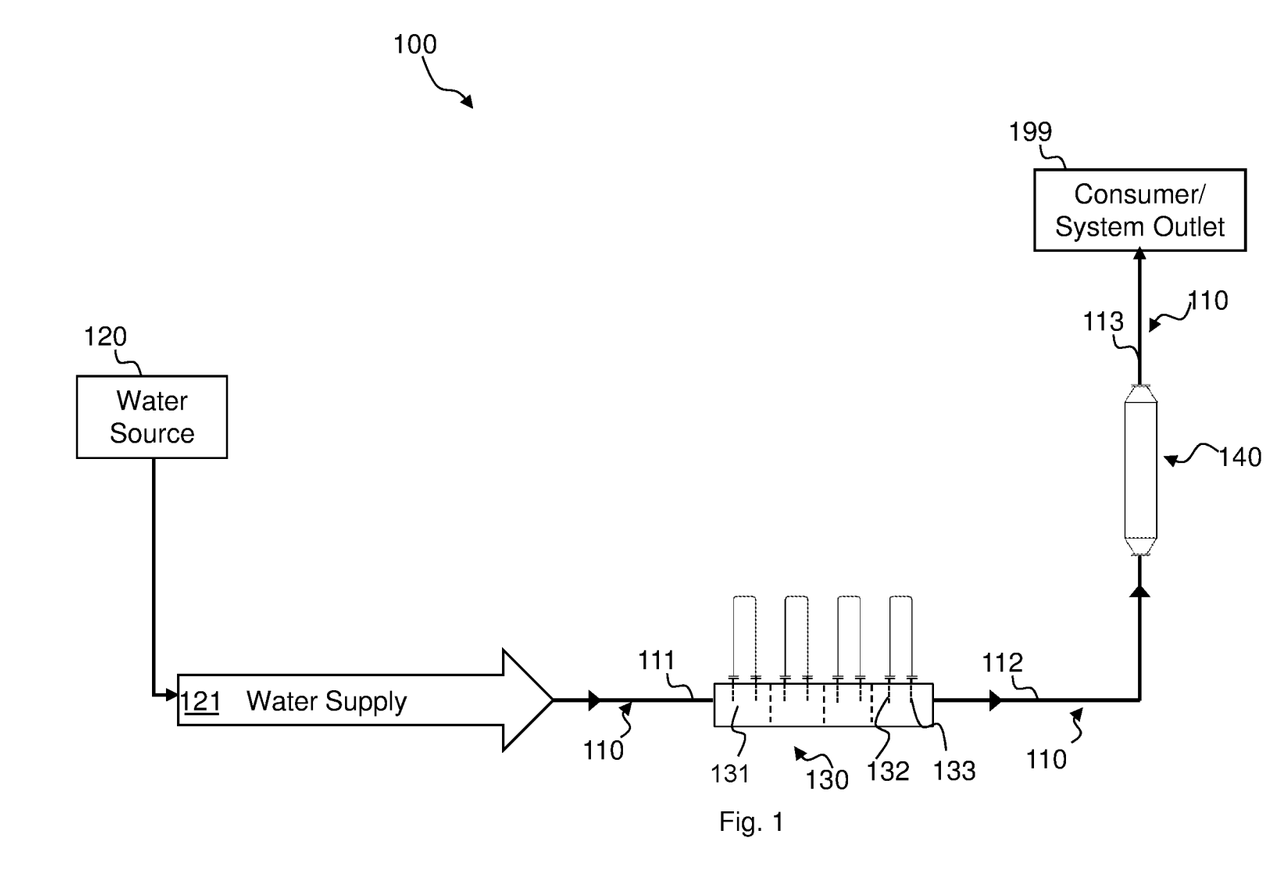
FIG. 1 is a schematic illustration of a water treatment system, in accordance with an embodiment.

Reference is now made to FIG. 1, which schematically illustrates a water treatment system, which may henceforth be referred to as "treatment system" 100, in accordance with an embodiment.

Treatment system 100 includes a non-chemical or electrolytic hardness reducer 130 that is operative to reduce the hardness of water thereby obtaining high-quality water. Treatment system 100 further includes a non-chemical disinfectant reducer like, e.g., UV disinfectant reducer 140 that comprises an ultraviolet light source (e.g., UV medium pressure lamp having a wide emission spectrum) that is operative to substantially remove disinfectants from the water by reducing the concentration of disinfectants (e.g., free chlorine and/or chlorine compounds) dissolved in the water by irradiating the water with UV light. For example, the concentration of free chlorine and/or chlorine compounds may be reduced to about 0.05 parts per million (ppm) or less, as $CaCO_3$ equivalent. UV disinfectant reducer 140 may have the form of a tube through which the water can flow, and comprise UV lamps for irradiating the water flowing in the tube. In some embodiments, the tube and the UV lamps may be arranged so that the UV light is totally internally reflected by the inner side walls of the tube. Treatment system 100 may also include piping 110 for example configured such that a water source 120, electrolytic hardness reducer 130, UV disinfectant reducer 140 and a consumer/system outlet 199 may be in fluid communication with each other.

Although embodiments described herein may relate to a configuration in which UV disinfectant reducer 140 is connected downstream of electrolytic hardness reducer 130, this should by no means to be construed as limiting. Some or all embodiments outlined herein may also refer to a configuration in which electrolytic hardness reducer 130 is connected downstream of UV disinfectant reducer 140.

Reducing water hardness through electrolysis by running the water through electrolytic hardness reducer 130 and substantially remove disinfectants from the water by irradiating the water with UV light, e.g., by running the water through UV disinfectant reducer 140, may hereinafter be referred to as "pretreatment". In some embodiments, pretreatment may also encompass adding online or in batches a disinfectant to the water that is recirculated back into electrolytic hardness reducer 130 via a recirculation piping.

Piping 110 may comprise in some embodiments a first piping portion 111 operative to receive the water from water source 120 and be in fluid communication with electrolytic hardness reducer 130 such to provide the latter with water 121 supplied from water source 120. Piping 110 may further include a second piping portion 112. Second piping portion 112 may be in fluid communication with an outlet of electrolytic hardness reducer 130 to receive water having reduced hardness and which may also be in fluid communication with an inlet of UV disinfectant reducer 140 to provide UV disinfectant reducer 140 with the water having reduced hardness received from electrolysis hardness reducer 130. A third piping portion 113 may be in fluid communication with an outlet of UV disinfectant reducer 140 to receive water from UV disinfectant reducer 140. Third piping portion 113 may also be in fluid communication with consumer 199 to provide the latter with the water received from UV disinfectant reducer 140.

Pretreated feed water provided by UV disinfectant reducer 140 may have, compared to the water supplied by water source 120, reduced hardness and be substantially free of disinfectants. The pretreated feed water may be further processed to obtain high-quality water which may be delivered to consumer/system outlet 199 via third piping portion 113.

130 comprises a receptacle 131 (e.g. one receptacle or a plurality of receptacles in parallel arrangement with respect to the water inflow) operative to receive water from water source 120 via first piping portion 111, and an anode 132 and a cathode 133 arranged such to come at least partially in contact with water received by receptacle 131. In some embodiments, cathode 133 may at least partially form receptacle 131. Accordingly, cathode 133 may have the form of a tank or container. Anode 132 may be arranged within receptacle 131 such that cathode 133 surrounds anode 132. Otherwise stated, cathode 133 may be circumferential to anode 132. For example, if receptacle 131 has a substantially cylindrical form and comprises walls that extend upwardly from a substantially flat surface, anode 132 may be positioned substantially in alignment with the cylindrical symmetry axis of receptacle 131. Anode 132 and cathode 133 may thus form an electrolysis reaction chamber. Anode 132 and cathode 133 may be made of any suitable material such as, for example, stainless steel or carbon steel. Correspondingly, receptacle 131 may for example be made of stainless or carbon steel. Electrolytic hardness reducer 130 may include a power source (not shown) coupled with anode 132 and cathode 133 operative to cause flow of electrical current through the water between anode 132 and cathode 133. Electrolytic hardness reducer 130 may further comprise a conductivity sensor (not shown) and a power controller both of which are operatively coupled with the power source. The conductivity sensor is configured to measure the inlet water conductivity. In the event the inlet water conductivity falls below a certain threshold, the water may be diverted to a piping (not showing) bypassing electrolytic hardness reducer 130 to prevent the water from dissolving scale that might have been built up in electrolytic hardness reducer 130.

Additionally or alternatively, mixing of treated water with tap water prior to feeding electrolytic hardness reducer 130 with water may be stopped so that electrolytic hardness reducer 130 is substantially fed with tap water only, until the measured inlet water conductivity exceeds the other predetermined threshold. If the measured inlet water conductivity exceeds the other predetermined threshold, treated water recirculation may resume.

The voltage difference to which anode 132 and cathode 133 may be subjected to may be set responsive to the predetermined current for dissociating the water molecules into OH⁻ and H⁺ ions. The voltage difference may for example be about 24 V DC or less. The predetermined threshold current may for example have a magnitude of at least 4, 5, 6, 7, 8, 9, 10, 11 and 12 Ampere. In some embodiments, the dissociation current may for example range between about 10 Ampere and 12 Ampere.

Responsive to driving an electrical current through the water, the concentration of OH⁻ ions near and/or at cathode 133 and the concentration of H⁺ ions near and/or at anode 132 increase. The increase in concentration of OH⁻ ions may, in turn, cause build-up of scale near and/or at cathode 133. The build-up of scale near and/or at cathode 133 reduces at the same time the hardness of the water in receptacle 131. The water may be delivered to the output of electrolytic hardness reducer 130 once its hardness level falls below a certain threshold level. For a given water temperature and pressure, and for a given concentration of multivalent cations (measured, e.g., in [ppm] as $CaCO_3$ equivalent) dissolved in the water, the electrical current to run through the received water may thus be selected to reduce the hardness of the received water to fall below a value such that the chemical equilibrium conditions required for scale to generate between the outlet of electrolytic hardness reducer 130 and system outlet 199 of treatment system 100 remain substantially unmet. In other words, the precipitation time required for the generation of scale may be increased through the reduction of water hardness to an extent so that treatment system 100 remains substantially scale-free, at least from the outlet of electrolytic hardness reducer 130 at least up to the location where the water leaves treatment system 100 for delivery to consumer/system outlet 199. In other words, the reduction in water hardness may reduce scaling saturation tendency downstream electrolytic hardness reducer 130 resulting in a corresponding increase in scale precipitation time by a factor equaling, for example, at least about 1.5, 2, 2.5, 3, 4, 5, 6 or 7, depending on the ppm value, as $CaCO_3$ equivalent, and the water pressure. For example, scale may start precipitating after about 2 seconds in the water having particle concentration ranging, for example, between about 1000 and about 1300 ppm, as $CaCO_3$ equivalent, at a pressure ranging between, for example, about 12 bar and about 15 bar, and at a temperature ranging, for example, between about 15° C. and about 25° C. On the other hand, no scale may precipitate in the water at atmospheric pressure having a particle concentration ranging, for example, between about 1000 and about 1300 ppm, as $CaCO_3$ equivalent, and that is a temperature ranging, for example, between about 15° C. and about 25° C.

More specifically, the hardness of the received water may be reduced such that at least one of the following equilibrium conditions remains substantially unmet downstream electrolytic hardness reducer 130, e.g., at least up to the location where the water leaves treatment system 100. For example, with respect to Calcium and Magnesium cations, the following reactions may therefore not occur:

$$Ca^{2+}_{(aq)} + 2HCO_3^- \rightarrow CaCO_3 + H_2O + CO_2 \quad (1)$$

$$Mg^{2+}_{(aq)} + 2OH^- \rightarrow Mg(OH)_2 \quad (2)$$

Water hardness of the received water may be reduced to an extent so that scale may have to be removed from receptacle 131 at most, e.g., about once every 3 months 6 months, 8 months, 10 months or 12 months. Scale may be removed from receptacle 131 in a non-chemical manner, i.e., no chemical cleaning reagent has to be employed to remove scale. The scale may be removed by turning receptacle 131 upside down and optionally by shaking the latter so that substantially all scale built up in receptacle 131 falls out and/or off its walls.

In some embodiments, water hardness of the received water may be reduced, for example, by depositing about 0.01 kg/m³ or less of, e.g., $CaCO_3$ scale, yet more than 0, or equal or more than 0.01 gram scale/m³ scale of, e.g., $CaCO_3$. Considering a water inlet flow rate into electrolytic hardness reducer 130 of about, e.g., about 1 to 2 m³/hr, the amount of scale deposited in electrolytic hardness reducer 130 may for example range from about 0.001 kg to about 0.002 kg scale. In some embodiments, less than 0.001 kg scale may be deposited for a water inlet flow ranging for example from about 1 to 2 m³/hr.

In some embodiments, electrolytic hardness reducer 130 may be operative to receive water having a hardness indicated by conductivity that ranges from, for example, about 200 μSiemens/cm to, for example, about 5000 μSiemens/cm and reduce the hardness of the received water using a process that is free of the introduction and/or addition of chemical reagents into treatment system 100 so that the latter remains substantially scale-free downstream of electrolytic hardness reducer 130. Treatment system 100 may for example remain scale-free at least up to the location where the water leaves treatment system 100. The conductivity at the outlet of electrolytic hardness reducer 130 may remain substantially unchanged. In some embodiments, the water's conductivity downstream of electrolytic hardness reducer 130 and/or downstream UV disinfectant reducer 140 may be such so to prevent oxidation in treatment system 100, e.g., to prevent corrosion of piping 110 and/or of other equipment of treatment system 100. In other words, the water downstream of electrolytic hardness reducer 130 and/or downstream UV disinfectant reducer 140 may be substantially non-responsive to oxidation with respect to equipment of a treatment system according to an embodiment.

In some embodiments, electrolytic hardness reducer 130 may be operative to sufficiently reduce the hardness of water to generate hardness-reduced water at a rate ranging, for example, from about 50 liters/hour to about 50,000 liters/hour. The power that may have to be provided to obtain about 1000 liters per hour of the hardness-reduced water may range from, for example, about 2 Watts to about 4 Watts.

In some embodiments, electrolytic hardness reducer 130 may be configured to convey carbon dioxide generated in the reaction chambers away from the chambers. As a result thereof, the impact carbon dioxide otherwise might have on the measurement of the water's conductivity running through the treatment system like, for instance, at the product outlets of at least one of RO (e.g., single or double-pass RO) and/or DI and/or CDI and/or WFI distillation apparatus and/or PSG, may be reduced or substantially eliminated.

Accordingly, conductivity measurement downstream of electrolytic hardness reducer 130 may be substantially unaffected by carbon dioxide. Configuring electrolytic hardness reducer 130 in a manner that removes carbon dioxide from the water may obviate the need of the employment of other carbon dioxide removal measures such as adding a chemical reagent, like NaOH, to increase the water's pH value, or arranging contact membranes for receiving aqueous fluid flow on one side and a sweep gas and/or vacuum applied to the other side of the membrane.

Treatment system 100 may be configured to be sanitizable with hot water at a temperature ranging, for example, from about 65° C. to about 95° C. For instance, treatment system 100 may be configured such that water supply 121 can be heated up for sanitation purposes. In some embodiments, water treated by electrolytic hardness reducer 130 may be recirculated so that, despite the increase in the water temperature for sanitation purposes, no scale is generated. The hot water can be run through electrolytic hardness reducer 130 substantially without inflicting any damage to it and substantially without impairing its subsequent electrolytic hardness-reducing operation. Otherwise stated, electrolytic hardness reducer 130 remains substantially unaffected with respect to its functionality by undergoing hot-water sanitation.

It is noted that discussions relating to "running water" and "passing water" through equipment and grammatical variations thereof may also encompass the meaning of expressions like "flowing water", "flushing water" and/or "circulating water" through the equipment while the equipment is in an operation mode in which impurities are removed from water, or in a sanitation mode in which equipment and piping is sanitized.

Figure 2:
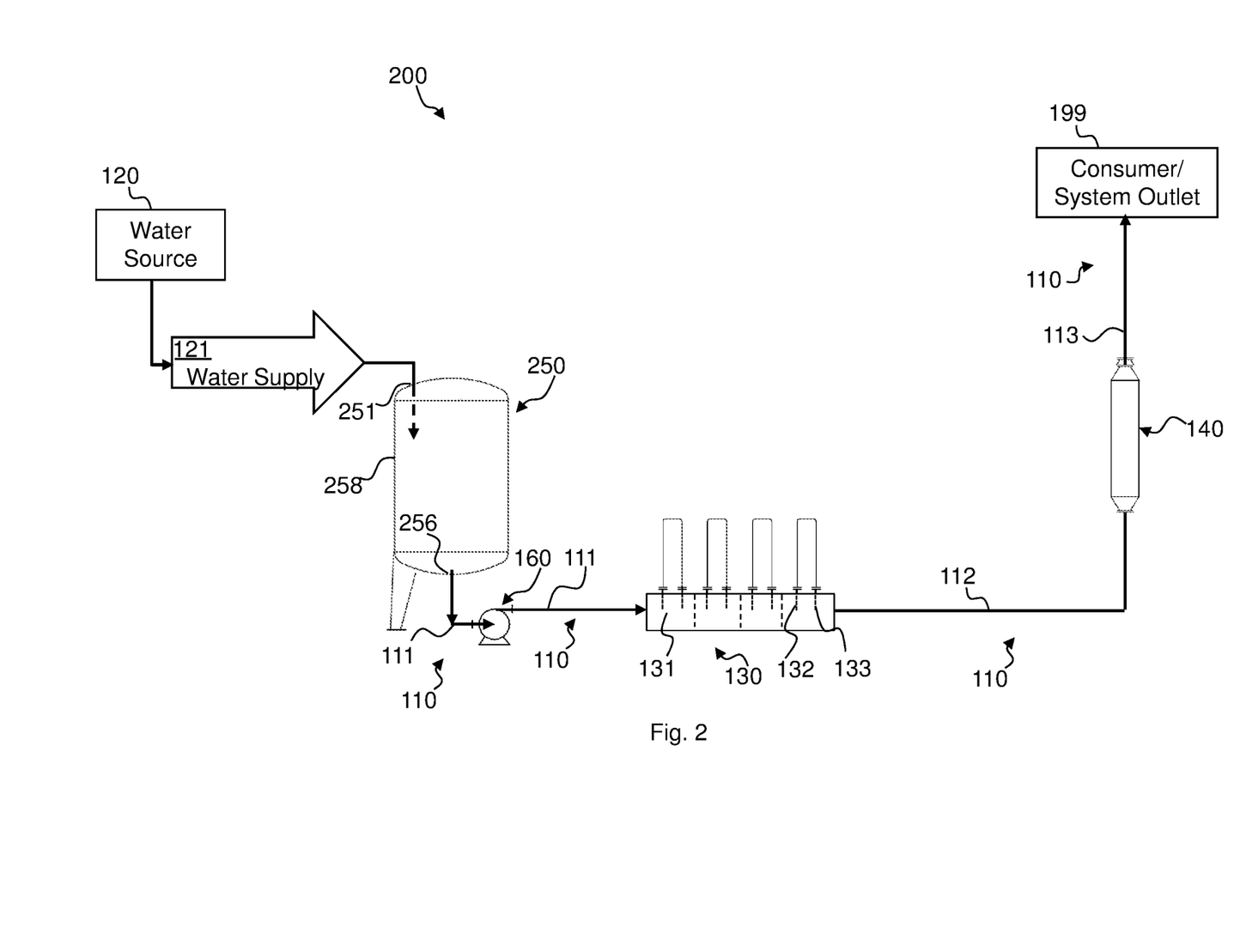
FIG. 2 is a schematic illustration of a water treatment system, in accordance with another embodiment.

Reference is now made to FIG. 2, which schematically illustrates a water treatment system 200 in accordance with another embodiment.

In some embodiments, treatment system 200 may include a storage tank 250 that is in fluid communication with water source 120 for storing water supplied by water source 120. In some embodiments, water source 120 may for example be a source for tap or city water supply. A disc filter, or any other type of filter (not shown) may be provided for filtering tap water entering storage tank 250.

Treatment system 200 may further include a pump 160 having a pump inlet 161 that is coupled with an outlet 256 of storage tank 250 and a pump outlet 162 that is coupled with the inlet of electrolytic hardness reducer 130 for pumping water from storage tank 250 into electrolytic hardness reducer 130 via first piping portion 111 at flow rates ranging, for example, from about 50 to about 50,000 liters/hour. Pump 160 may be operative to provide a pump outlet pressure that ranges, for example, between about 2 bar and about 4 bar.

Capacity of storage tank 250 may range, for example, from about 50 to about 10,000 liters, and may be made of any suitable material such as, for example, carbon steel or stainless steel which may for example be of austenitic or grade 300 series such as, for instance, grade 304 or grade 316L. For example, parts of storage tank 250 that may come in contact with the water supplied from water source 120 via first tank inlet 251 may be made from stainless steel of grade 316L, and parts of storage tank 250 that in general do not come in contact with the water supplied by water source 120 may be made of stainless steel of grade 304 or carbon steel.

As briefly outlined hereinabove, a treatment system according to an embodiment may be configured to undergo sanitation with hot water at a sanitation temperature ranging, for example, from about 65° C. to about 95° C. For instance, storage tank 250 may be equipped with a heating element and/or a heat exchanger on the pump outlet (not shown) operative to heat up water in storage tank 250 to the desired sanitation temperature. The operation of the heating element may be controlled responsive to a temperature sensor (not shown) sensing the water temperature in storage tank 250. Correspondingly, storage tank 250, first piping portion 111 and second piping portion 112 and related return feed piping 114 may as well undergo hot water sanitation.

Storage tank 250 may be equipped with a water inlet valve (not shown) regulating the water supply into storage tank 250 and a level measurement device (not shown) for monitoring the water level in storage tank 250. The inlet valve may be operatively coupled with the level measurement device such that the inlet valve is operated responsive to the water level measured by the level measurement device. The inlet valve may, for example, be a pneumatically actuated valve. The level measurement device may for example be embodied by an analogue or digital level or hybrid analogue-digital measurement device. A digital level measurement device may for example include a plurality of level switches. The plurality of level switches may be positioned at different heights of storage tank 250 to provide, for the respective height positions, an indication of the presence of the water in storage tank 250. For example, a first level switch may be located near or at the bottom of storage tank 250 such to provide an indication when the water level in storage tank 250 is below a water level threshold required for safe operation of pump 160. A second level switch may be located above the first level switch and provide, for example, an indication of the requirement to refill storage tank 250 with water. A third level switch may be positioned above the second level switch to provide an indication to stop the supply of water into storage tank 250. A fourth level switch may be provided above the third level switch, e.g., near or at the top of storage tank 250 to alert about potential storage tank 250 overflow.

In some embodiments, storage tank 250 may be configured to withstand inside atmospheric pressure and/or vacuum, and may comprise an air vent and overflow pipe. The inner surfaces of tank 250 that might come into contact with the water supplied by water source 120 may have suitable surface finish ratings, e.g., ranging from food grade to Ra=0.4 or less micrometer, with or without electropolishing.

In some embodiments, the parts of storage tank 250 that might come into contact with the water supplied by water source 120 may be configured such to be sanitizable at, for example, a temperature ranging from about 65° C. to about 95° C., without becoming damaged thereby. At least some parts of tank shell 258 may be insulated from the environment, e.g., by chlorine and/or asbestos free rock wool or by any other suitable material. The outside wall of tank shell 258 may be made of, e.g., stainless steel of grade 304 and/or of any other suitable material.

Pump 160 may, for example, be embodied by a centrifugal pump and may be made of any suitable material such as, for example, stainless steel grade 316. Pump 160 may comprise a controller (not shown) operative to adjust pump speed and optionally alert about pump 160 failure.

Figure 3:
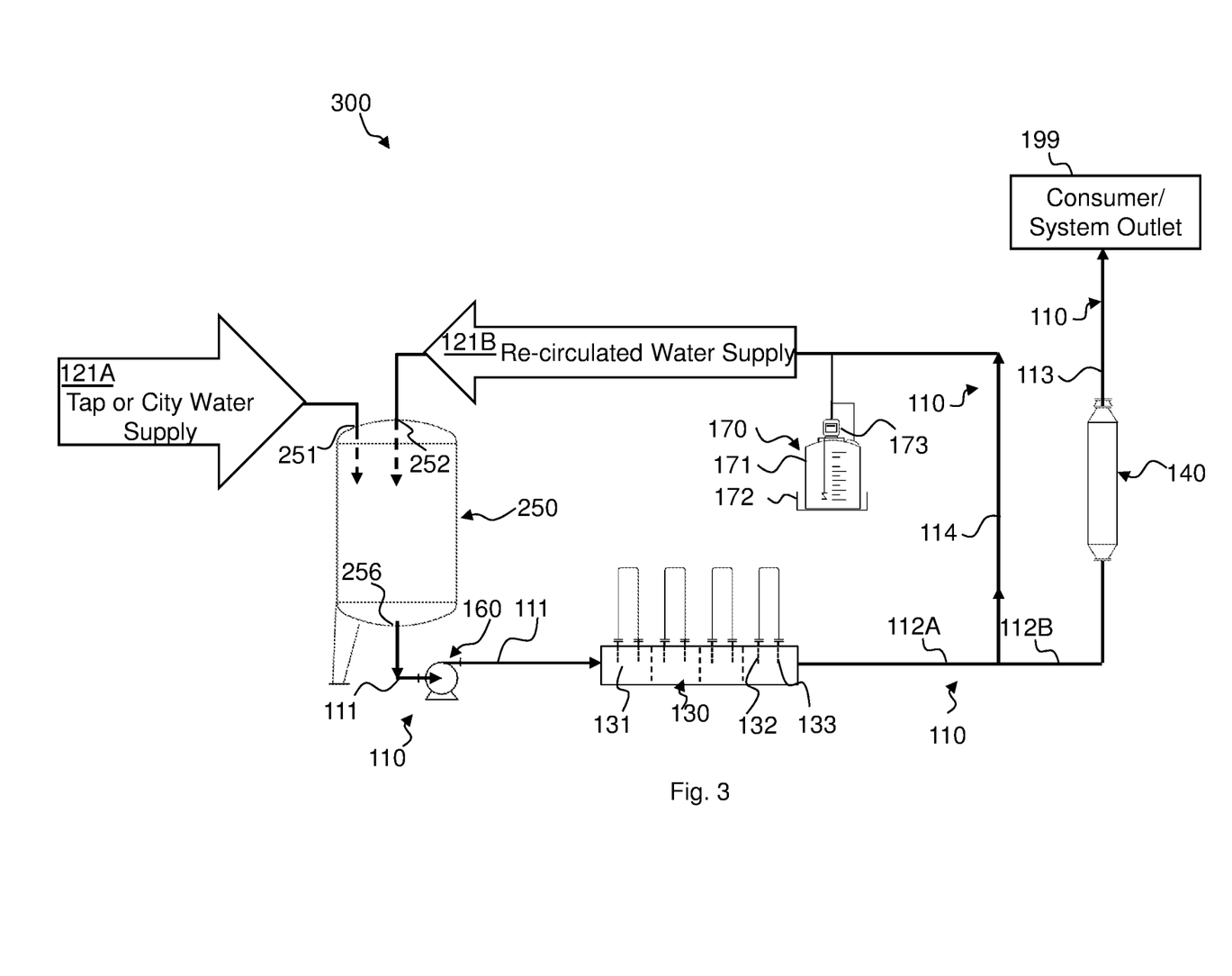
FIG. 3 is a schematic illustration of a water treatment system, in accordance with an alternative embodiment.

Additional reference is made to FIG. 3, which schematically illustrates a water treatment system 300 in accordance with an alternative embodiment. In some embodiments, treatment system 300 may receive water from a plurality of water sources (not shown). A first water source (not shown) may for example supply city or tap water 121A and a second water source may for example supply re-circulated water 121B, as outlined herein below in greater detail.

Treatment system 300 includes piping 110 which may additionally include a return feed piping 114 extending in fluid communication from second piping portion 112 to divide the latter into two sections 112A and 112B such that return feed piping 114 and section 112B are in parallel fluid communication with section 112A. Water flow provided by electrolytic hardness reducer 130 is thus divided up between return feed piping 114 and section 112B. The water flow rate into return feed piping 114 and section 112B may, for example, be governed by a hand valve (not shown). The inlet of return feed piping 114 may be in fluid communication with the outlet of electrolytic hardness reducer 130 and an outlet of return feed piping 114 may be in fluid communication with the inlet of electrolytic hardness reducer 130, e.g., via storage tank 250 through a second tank inlet 252, such that a first amount of the hardness-reduced water provided by electrolytic hardness reducer 130 may be provided to UV disinfectant reducer 140, and a second amount of the hardness-reduced water may be re-circulated back to electrolytic hardness reducer 130. Hot water at a temperature ranging for example, from about 65° C. to about 95° C. can be flushed through electrolytic hardness reducer 130 and UV disinfectant reducer 140 for sanitation purposes without negatively affecting their operability regarding lowering water hardness and disinfectant concentration in the water. In addition, piping system 110, including return feed piping 114, can also undergo hot water sanitation at a temperature ranging for example, from about 65° C. to about 95° C.

Treatment system 300 may include storage tank 250 configured to respectively receive via first tank inlet 251 and a second tank inlet 252, for example, tap water 121A and re-circulated water 121B that is provided by electrolytic hardness reducer 130. By re-circulating and mixing some hardness-reduced water with tap water prior to pumping the water back into electrolytic hardness reducer 130, the overall concentration of multivalent cations dissolved in the water fed into electrolytic hardness reducer 130 may be reduced. In other words, recirculation may cause the reduction of water hardness received by electrolytic hardness reducer 130 compared to the hardness of water received by electrolytic hardness reducer 130 if no circulation would occur. Recirculation may thus cause a reduction in the amount of energy to be invested for maintaining the hardness level from electrolytic hardness reducer 130 below the chemical equilibrium at which scale is built up.

In some embodiments, a filter (not shown) may be provided for filtering water flowing through second piping portion 112. The filter may be configured to filter solids suspended in the water and which have an average diameter of, e.g., about 25 μm or less, like, for example, solids having an average diameter of about 3 μm.

Treatment system 300 may include in some embodiments a disinfection apparatus 170 that is in fluid communication with return feed piping 114 to disinfect the water. Disinfection apparatus 170 may be operative to provide a disinfectant such as, for example, hypochlorite, ozone and/or chlorine dioxide and/or chloramine to re-circulated water supply 121B. The concentration of any one of the above-mentioned disinfectants to the water may later be reduced, for example, by UV disinfectant reducer 140. Possible byproducts of the water treatment by UV disinfectant reducer 140 may then be filtered out by an RO apparatus 180 and/or DI and/or CDI by WFI distillation unit and/or a PSG and/or any other suitable water treatment equipment.

The amount of disinfectant added may be chosen such that storage tank 250 is fed by with substantially disinfected water by re-circulated water supply 121B yet, optionally, to an extent to retain some residual of disinfectant for controlling bacteria in water supply 121 to storage tank 250. During operation, the concentration of free or total chlorine and/or chloramines and/or chlorine dioxide in storage tank 250 may range, for example, from about 0.2 ppm to about 1 ppm, as $CaCO_3$ equivalent. During operation, ozone concentration in storage tank 250 may range, for example, from about 20 ppb to about 1 ppm, as $CaCO_3$ equivalent.

Disinfection apparatus 170 may comprise, for example, a barrel 171 that is in fluid communication with a disinfectant pump 173 operative to pump a disinfectant from barrel 171 into return feed piping 114. Barrel 171 may be made of any suitable material to receive a disinfectant. With respect to chlorine and/or chloramine for instance, barrel 171 may for example be made of polyethylene and have a capacity of e.g., about 20 liters. Disinfection pump 173 may for example be a diaphragm pump. When employing disinfection through chlorine dioxide, disinfection apparatus 170 may be embodied by a chlorine dioxide generator (not shown). When employing disinfection through ozone, disinfection apparatus 170 may be embodied by a ozone generator (not shown) configured to maximize mixing of the ozone with the water in storage tank 250 and piping 110. Disinfection apparatus 170 may further comprise a secondary containment element 172 configured to receive disinfectant that might leak from barrel 171. In some embodiments, a disinfection analyzer (not shown) may be provided and coupled with return feed piping 114 downstream of disinfection apparatus 170 to determine the concentration of the disinfectant in re-circulated water supply 121B. Disinfection apparatus 170 may be operatively coupled with the disinfection analyzer such that operation of disinfection pump 173 may be responsive to the measured disinfectant concentration.

Return feed piping 114 may in some embodiments be equipped with a water temperature controlling arrangement (not shown) which may be embodied, for example, by a heat exchanger (e.g., plate heat exchanger) configurable so that the temperature of water flowing in return feed piping 114 can be maintained within a predetermined range. For example, the water temperature controlling arrangement may be configured such that the temperature of water flowing in return feed piping 114 ranges, for example, between about 15° C. and about 25° C., responsive to a water temperature reading in storage tank 250 by a temperature sensor (not shown).

Figure 4:
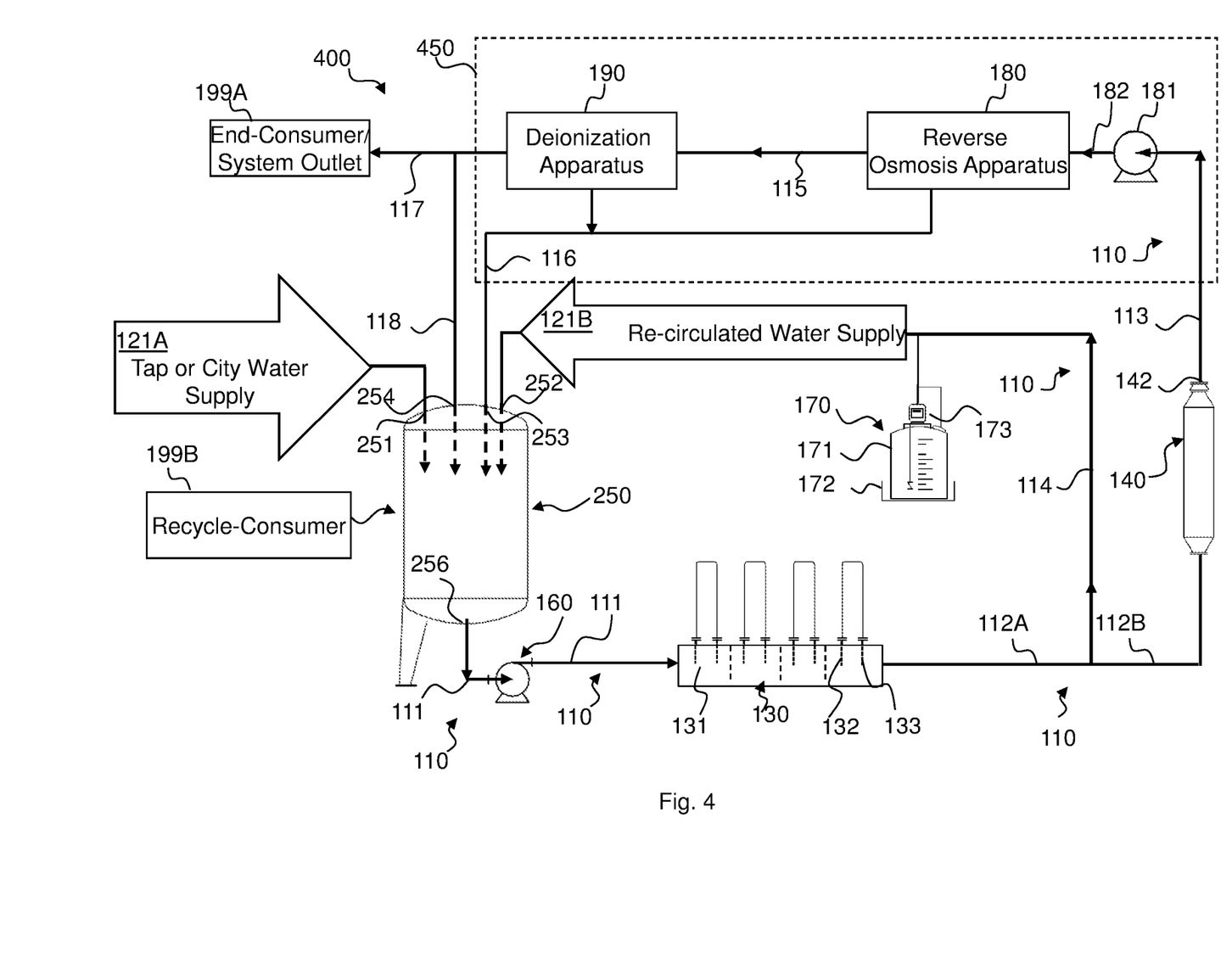
FIG. 4 is a schematic illustration of a water treatment system, in accordance with a yet alternative embodiment.

Further reference is now made to FIG. 4, which schematically illustrates a water treatment system 400, in accordance with a yet alternative embodiment. Treatment system 400 may include a water purification arrangement 450 for the production of high-quality water that may, for example, meet pharmacopeial conventions as defined by, e.g., United States and/or European pharmacopeia. Such water may hereinafter be referred to as "compedial water". For instance, conductivity of compedial water such as, for example, PW, HPW, WFI and/or PS, at about 25° C. may be 1.3 μSiemens/cm or less; the total organic carbon may be 500 parts per billion or less; and the bioburden may be 100 colony forming units (CFU)/1 ml or less for PW for example; and the bioburden may be 10 colony forming units (CFU)/100 ml or less for HPW and/or WFI and/or PS.

For example, water whose hardness and disinfectant concentration is lowered, treated by a reverse osmosis process and/or deionized may qualify as PW, HPW or WFI. Correspondingly, water purification arrangement 450 may in some embodiments comprise RO apparatus 180 and/or a Deionization (DI) apparatus 190 (like e.g., a non-continuous or continuous DI unit) and/or a PSG and/or a distillation unit that are in fluid communication with outlet 142 of UV disinfectant reducer 140 for the production of compedial water. More specifically, in some embodiments an inlet of RO Apparatus 180 may be in fluid communication with outlet 142 of UV disinfectant reducer 140 via third piping portion 113. By running water through RO apparatus 180, RO product water and RO concentrate or reject water is obtained. Hardness of water may be reduced by electrolytic hardness reducer 130 so that scale precipitation time of RO concentrate equals, for example, about 1, 1.5, or 2 seconds or more. On the other hand the precipitation time may be, for example, about 10 seconds or less, 5 seconds or less, 4 seconds or less, 3 seconds or less, or 2.5 seconds or less.

RO product water is supplied by RO apparatus 180 through an RO product outlet via a fifth piping portion 115 to a DI inlet (not shown) of DI apparatus 190. RO product water may then be run through DI apparatus 190 for deionization of the received RO product water. By running RO product water through DI apparatus 190, DI concentrate water and compedial water may be obtained at respective outlets (not shown). In some embodiments, high-quality water such as, for example, compedial water may be supplied via piping section 117 to an end-consumer/system outlet 199A and/or through a piping section 118 via fourth tank inlet 254, to a water recycle-consumer 199B receiving water from water purification arrangement 450 for recycling water back into electrolytic hardness reducer 130 and UV disinfectant reducer 140.

End-consumer 199A may for example be embodied by a WFI distillation unit (not shown). In some embodiments, WFI can be produced by water provided to the WFI distillation unit without running through RO apparatus 180 by bypassing RO apparatus 180 and/or DI apparatus 190 or by arranging a water purification arrangement 450 that is free of an RO apparatus. Additionally or alternatively, WFI may be produced by processes that are free of the employment of a WFI distillation unit, by subjecting water to single- or double-pass reverse osmosis through RO apparatus 180 and/or deionization through DI apparatus 190 which may be embodied by a continuous DI apparatus.

In some embodiments, DI concentrate water may be mixed with tap water and RO concentrate water prior to feeding the water mixture back into electrolytic hardness reducer 130 for reducing the water hardness, e.g., by supplying storage tank 250 with RO and/or DI concentrate water via a concentrate supply piping 116. Storage tank 250 may receive water at about atmospheric pressure. For example, by the time RO concentrate water reaches a third tank inlet 253, the pressure may be reduced, for example, from less than about 15 bars to about atmospheric pressure and have a concentrate level and temperature so that treatment system 400 remains substantially scale-free after the respective concentrate outlets of RO apparatus 180 and DI apparatus 190.

RO apparatus 180 may be equipped with an RO pump 181 which may for example, be a multi-staged high-pressure pump made of, e.g., stainless steel. RO pump 181 may be configured to be protected by a low pressure cut-out (e.g., by a low pressure pump switch) for water pressure at the inlet of RO pump 181 and by a high pressure cut-out switch (e.g., by a high pressure pump switch) for the water pressure at outlet 182 of RO pump 181. The membranes (not shown) of RO apparatus 180 may be single or double-pass membranes. The membranes may have a permeate outlet capacity that ranges, for example, from about 50 liters/hour to about 50,000 liters/hour. RO apparatus 180 may be configured to provide a recovery factor, for example, in the range of about 0.5 to about 0.9. RO apparatus 180 may be equipped with sensors (not shown) for measuring water conductivity, flow rate and/or pressure at the inlet and the outlets of RO apparatus 180.

By employing electrolytic hardness reducer 130 and UV disinfectant reducer 140, water treatment system 100 may be operable in a substantially chemical-reagent free manner at least with respect to the processes of lowering water hardness and disinfectant concentration in water. As a result thereof, improvement in operational reliability and cost reduction may be achieved with respect to equipment of treatment system 100 such as pumps, piping, instrumentation and/or controls for the production of pretreated feed and high-quality water.

DI apparatus 190 may be operative to provide DI product water at a flow rate ranging, for example, from about 50 liters/hour to about 50,000 liters/hour, and having an outlet conductivity of about 1.3 µS/cm or less when having a temperature of about 25° C. or less.

In some embodiments, DI apparatus 190 may be configured so that they can be substantially continuously regenerated in a process that is free of the employment of chemical reagents, e.g., by employing an electrical field.

Water purification arrangement 450 may be sanitizable by hot water at a temperature ranging, for example, from about 65° C. to about 95° C. Correspondingly, RO apparatus 180, DI apparatus 190 and related inlet and outlet piping portions 113, 115, 116 and 118 may undergo hot water sanitation.

In some embodiments water purification arrangement 450 may be configured to produce compedial water that qualifies as Water for Injection by employing a distillation apparatus (not shown) and/or a pure steam generator (not shown). Analogously to what has been outlined hereinabove, hardness of water may be reduced by electrolytic hardness reducer 130 so that the distillation apparatus and/or the pure steam generator remain substantially scale-free.

The term "consumer" as used herein may refer to equipment and/or persons receiving water at least a certain amount of which is treated by the electrolytic hardness reducer to reduce the water hardness, and by the UV disinfectant reducer for lowering disinfectant (e.g., chlorine or chlorine compounds) concentration in the water. Otherwise stated, equipment downstream of UV disinfectant reducer 140 may be referred to as a consumer of treated water and may include, for example, water purification arrangement 450, end-consumer 199A of compedial water and/or water recycle-consumer 199B (e.g., storage tank 250).

It should be noted that all equipment and/or piping that may come in contact with treated water may be made of material that is substantially resistant to oxidation and may, therefore, remain substantially corrosion free.

Figure 5:
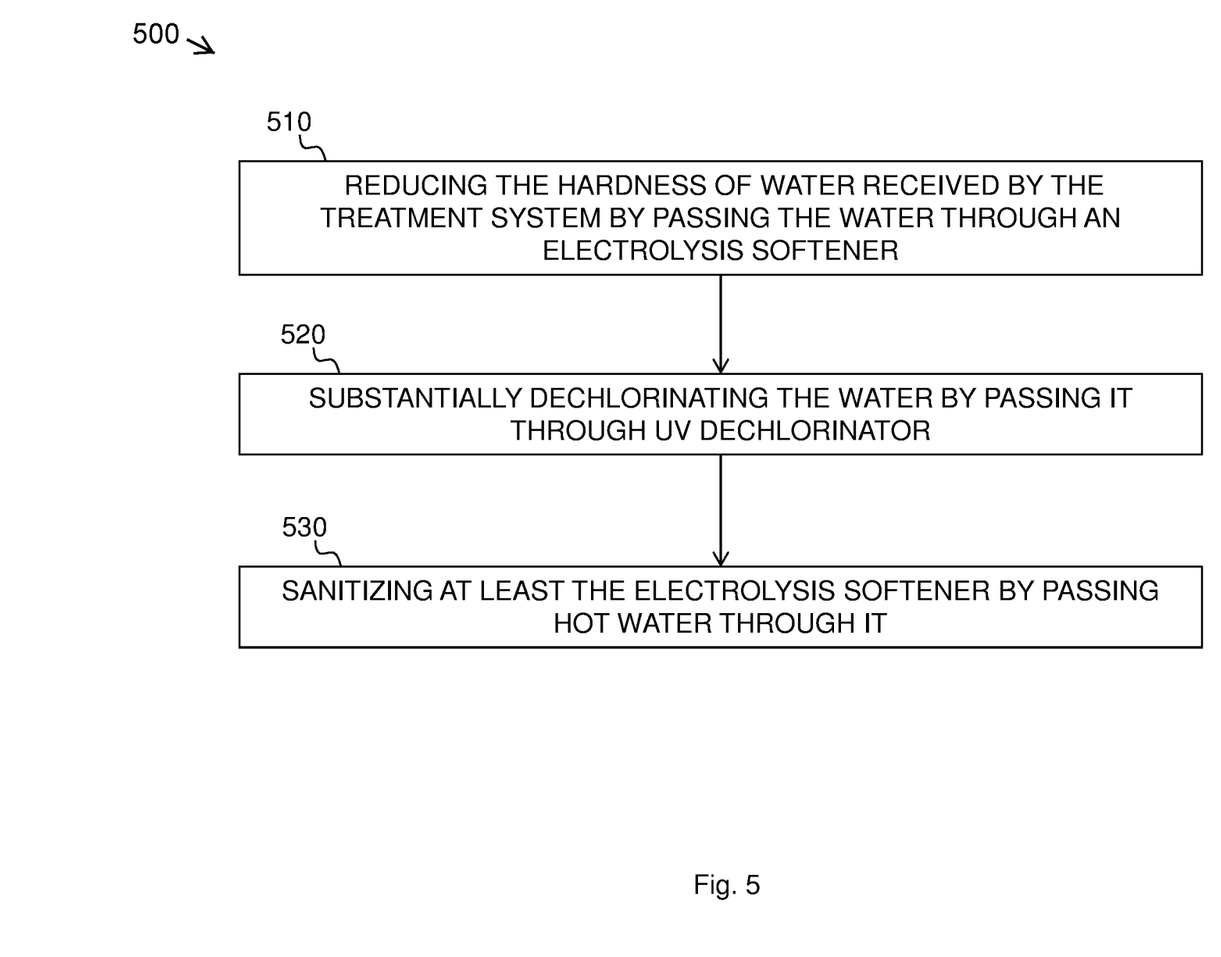
FIG. 5 is a flow-chart illustration of method for treating water, in accordance with an embodiment.

Further reference is now made to FIG. 5, which schematically illustrates a method for treating water, in accordance with an embodiment.

As indicated by box 510, the method may include, for example, reducing the hardness of the water by running the water through electrolytic hardness reducer 130.

As indicated by box 520, the method may further include, for example, substantially removing disinfectants from the water by running the water through UV disinfectant reducer 140.

As indicated by box 530, the method may further include, for example, sanitizing at least electrolytic hardness reducer 130 by running (e.g., circulating) hot water through it.

In some embodiments, the method may include sanitizing UV disinfectant reducer 140 by running (e.g., circulating) hot water through it.

In some embodiments, the method may include sanitizing piping 110 and storage tank 250 of a treatment system of an embodiment by circulating hot water through them.

It should be understood that where the claims or specification refer to "a" or "an" element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made.

In the discussion unless otherwise stated, adjectives such as "substantially" and "about" modifying a condition or relationship characteristic of a feature or features of an embodiment, are understood to mean that the condition or characteristic is defined to within tolerances that are acceptable for operation of the embodiment for an application for which it is intended.

Descriptions of embodiments in the present application are provided by way of example and are not intended to limit the scope of the embodiments. The described embodiments comprise different features, not all of which are required in all embodiments. Some embodiments utilize only some of the features or possible combinations of the features. Variations of embodiments that are described, and embodiments comprising different combinations of features noted in the disclosure, will occur to persons of the art. The scope of the embodiments is limited only by the claims.

What is claimed is:

1. A method for treating water received at a treatment system, the method comprising:
    reducing the hardness of the water by subjecting the water to electrolysis by an electrolytic hardness reducer;
    substantially removing disinfectant from the water by irradiating the water with ultraviolet light by a UV disinfectant reducer; and
    subjecting the water to reverse osmosis.

2. The method for treating water according to claim 1, comprising:
    sanitizing the electrolytic hardness reducer by running hot water through it.

3. The method for treating water according to claim 1, comprising:
    sanitizing the UV disinfectant reducing apparatus by running hot water through it.

4. The method for treating water according to claim 1, comprising:
    sanitizing a piping and a storage tank of the treatment system by running hot water through them.

5. The method for treating water according to claim 1, wherein the received water is first run through the electrolytic hardness reducer to reduce the water hardness and then through the ultraviolet disinfectant reducer for disinfectant removal.

6. The method for treating water according to claim 1, further comprising flowing water through a reverse osmosis apparatus to the water after removal of disinfectant wherein the electrolytic hardness reducer is operated at a current so that hardness of the water received by the reverse osmosis apparatus is reduced to yield hardness-reduced water to an extent that the conditions required for scale to build up remain substantially unmet at least until the water leaves the reverse osmosis apparatus.

7. The method for treating water according to claim 1, wherein the electrolytic hardness reducer is operated at a current so that water hardness is reduced to an extent that precipitation time downstream of UV disinfectant reducer is at least multiplied by a factor of one and a half for a given polyvalent cation concentration, water pressure, and water temperature.

8. The method for treating water according to claim 7, wherein the polyvalent cation concentration in the water is about 100 ppm, as $CaCO_3$ equivalent, or higher, water pressure equals about 2 bar or more; and the water temperature equals about 10° C. or higher.

9. The method for treating water according to claim 7, wherein the polyvalent cation concentration in the water is about 180 ppm or higher, as $CaCO_3$ equivalent, water pressure is about 12 bar or more, and the water temperature is about 10° C. or higher.

10. The method for treating water according to claim 7, wherein the polyvalent cation concentration in the water is about 180 ppm or higher, as $CaCO_3$ equivalent, water pressure equals about 15 bar or more, and the water temperature is about 10° C. or higher.

11. The method for treating water according to claim 7, wherein the polyvalent cation concentration in the water is about 180 ppm or higher, as $CaCO_3$ equivalent, water pressure equals about 15 bar or more, and the water temperature is about 25° C. or higher.

12. The method for treating water according to claim 1, wherein the electrolysis hardness reducer reduces water hardness in a manner that is free of the employment of chemical reagents.

13. The method for treating water according to claim 1, comprising subjecting the water to deionization.

14. The method for treating water according to claim 1, comprising evaporation of the water to obtain at least one of the products selected from a group of high-quality water products consisting of: water for injection, and pure steam.

15. A water treatment system, comprising:
    an electrolytic hardness reducer;
    an ultraviolet disinfectant reducer that is in fluid communication with and downstream from the electrolysis hardness reducer; and
    a reverse osmosis apparatus,
    wherein the ultraviolet disinfectant reducer is configured to substantially remove disinfectant from the water by irradiating the water with ultraviolet light.

16. The water treatment system according to claim 15, wherein the electrolytic hardness reducer is operative to reduce the hardness of water provided by a tap water supply to obtain hardness-reduced water and to provide the ultraviolet disinfectant reducer with the hardness-reduced water to substantially remove disinfectants from the hardness-reduced water.

17. The water treatment system according to claim 16, which is free of a sodium bisulfite supply and free of an active carbon filter.

18. The system according to claim 15, free of a softening agent.

19. The method according to claim 1 wherein the water hardness is reduced solely by the electrolytic hardness reducer.

20. The method according to claim 1 wherein the disinfectant removed from the water is a chlorine disinfectant selected from the group consisting of free chlorine and chlorine compounds.

* * * * *